United States Patent [19]

Flynn et al.

[11] 3,857,660

[45] Dec. 31, 1974

[54] INJECTION-BLOW MOLDING MACHINE

[75] Inventors: Joseph C. Flynn, Bridgeton; Walter Panas, Millville, both of N.J.

[73] Assignee: Wheaton Industries, Millville, N.J.

[22] Filed: Sept. 17, 1973

[21] Appl. No.: 397,842

[52] U.S. Cl. 425/242 B, 425/387 B, 425/DIG. 209, 425/DIG. 213, 425/DIG. 231
[51] Int. Cl. ................................ B29d 23/03
[58] Field of Search........ 425/242 B, 326 B, 387 B, 425/DIG. 209, DIG. 213, DIG. 231

[56] References Cited
UNITED STATES PATENTS

| | | | |
|---|---|---|---|
| 3,325,862 | 6/1967 | Mehnert | 425/326 B X |
| 3,694,124 | 9/1972 | Saumsiegle et al. | 425/242 B |
| 3,778,210 | 12/1973 | Heath, Jr. et al. | 425/326 B X |
| 3,784,348 | 1/1974 | Aoki | 425/242 B X |

*Primary Examiner*—Frank T. Yost
*Attorney, Agent, or Firm*—Miller, Frailey & Prestia

[57] ABSTRACT

A machine is provided for molding parisons of organic resinous thermoplastic material in a one piece injection mold, about a core rod, and for then transferring the parison on the core rod to a blow mold in which an article is formed by blow molding, followed by removal of the article from the blow mold. Transfer is accomplished by upward and then 180° rotational movement followed by a downward final movement. Particularly novel techniques and devices are presented for minimizing the time required for individual functions of the machine as well as the over-all cycle time of the machine, and for providing a machine of high reliability, flexibility, and operating efficiency. Specifically, improvements are made, interalia, in the transfer of cores from one mold to the other, in facilitating the setting of the parison and the setting of the neck portion thereof, in facilitating the discharge of the parison from the parison mold, in the construction of the cores and molds for facilitating the formation of hollow articles of increased depth, in facilitating the discharge of blown articles from the blow mold, in facilitating the neck setting independent of parison body setting, and in facilitating the delivery of temperature control fluids, air, and blowing gas to a movable head of the machine which carries movable cores.

15 Claims, 23 Drawing Figures

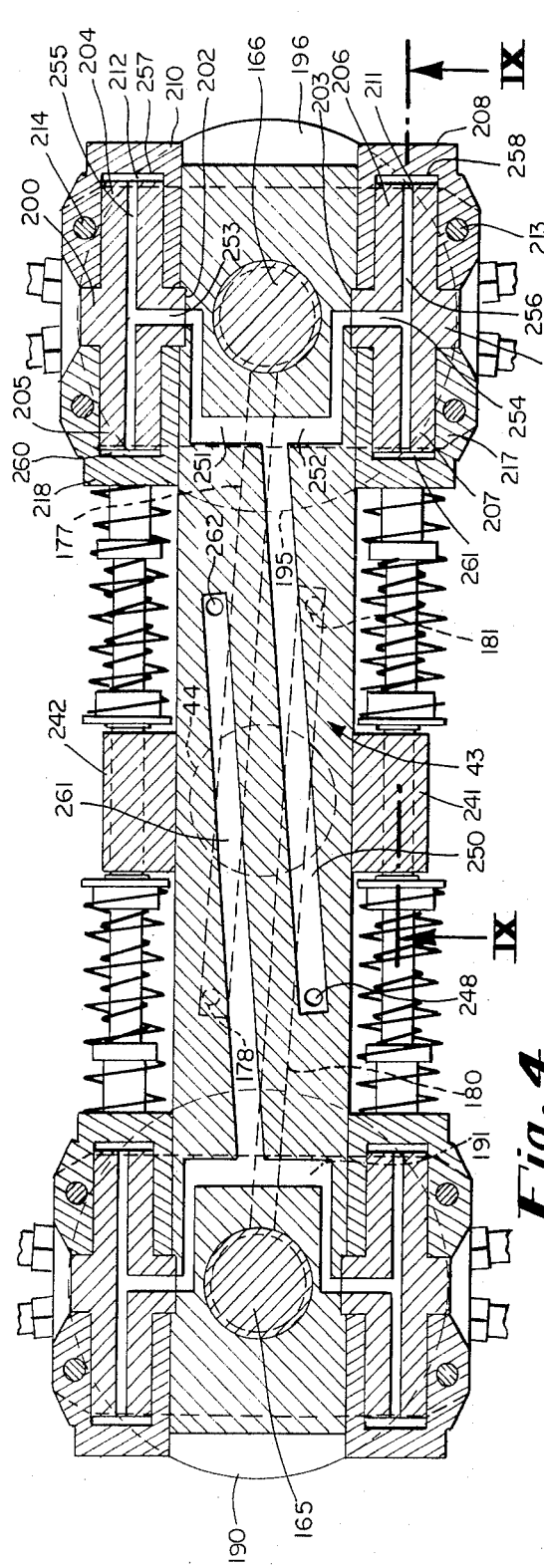
Fig. 4
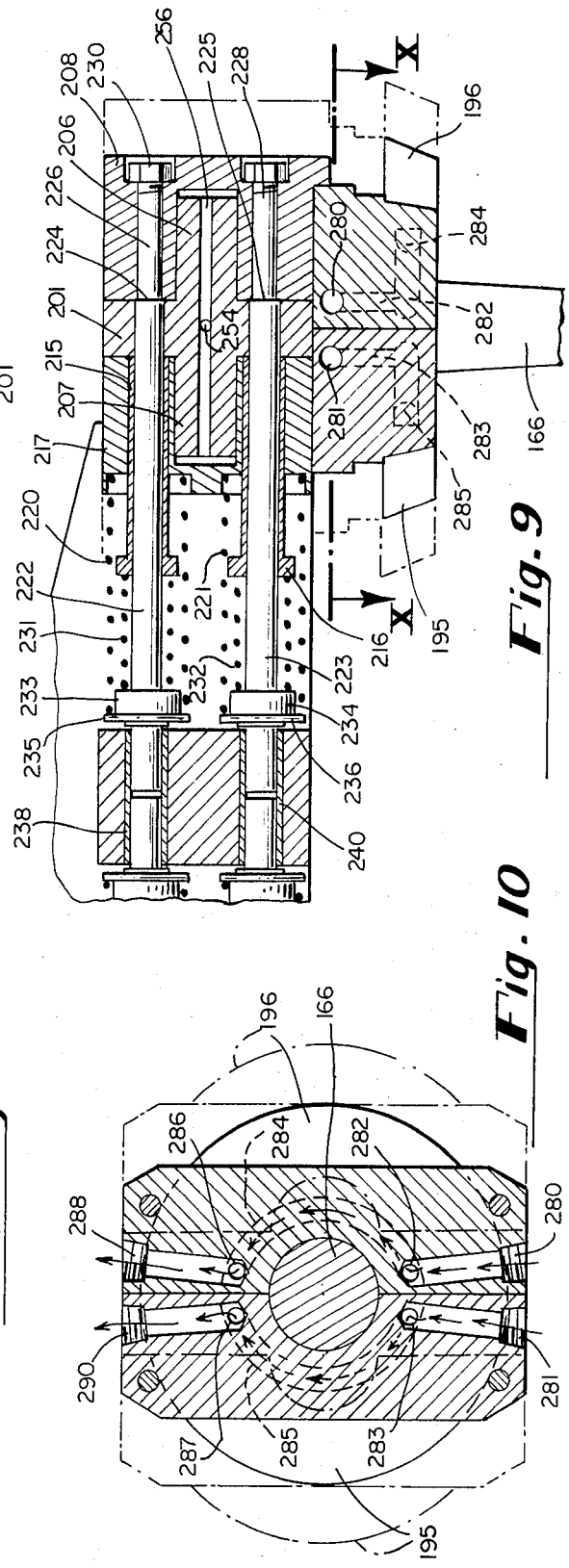
Fig. 9
Fig. 10

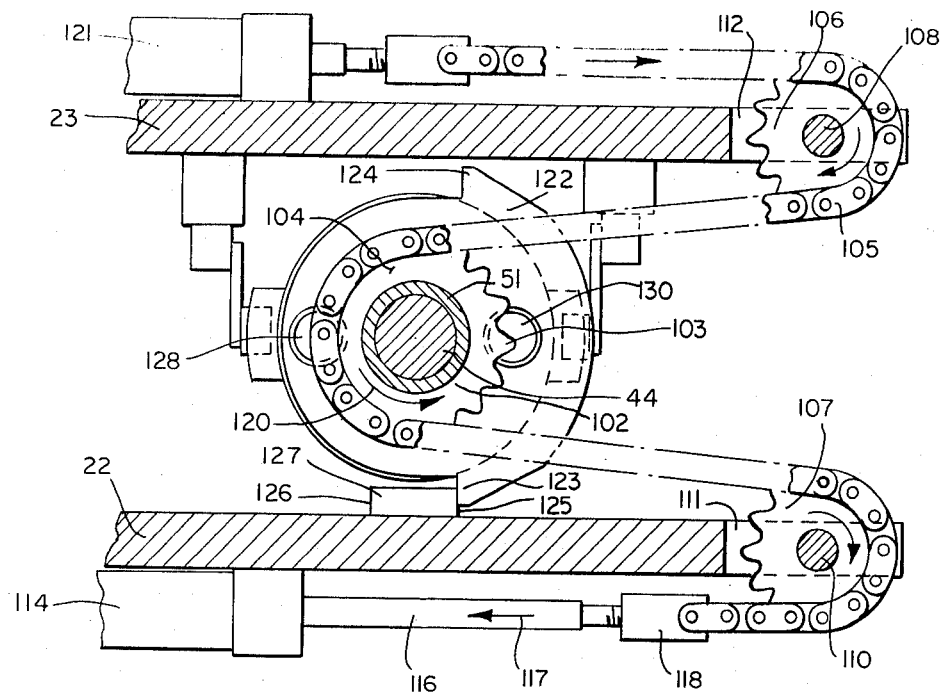
Fig. 6
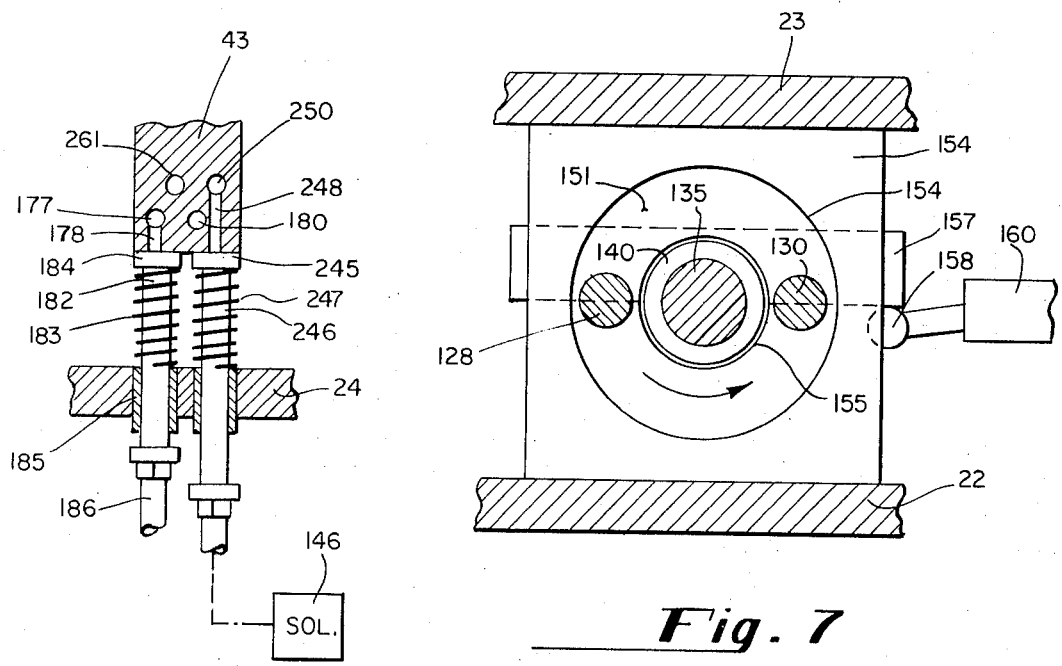
Fig. 8
Fig. 7

INJECTION-BLOW MOLDING MACHINE

BACKGROUND OF THE INVENTION

Most injection blow molding machines currently used on an industrial scale tend to be large and complicated. In large part this follows from efforts to build multicavity machines with short cycle times. Smaller machines based on this technology suffer similar handicaps. For the most part, two piece molds are used requiring a high capacity press to prevent flashing in parison molding. Concomitant limitations in the length to diameter ratio of the parison have also been a problem.

Other inherent problems in most currently available machines include either the necessity of an additional work station (apart from the injection and blow work stations) to permit work removal without interfering with the machine cycle or cycle interruption for work removal. The former requires additional tooling; the latter impairs machine efficiency.

Still another problem is that of minimizing transfer time, while optimizing parison body conditioning time and parison neck conditioning time. In many cases, depending on individual bottle and process requirements, these objectives conflict with one another.

In certain prior art machines, traveling neck rings or molds have accomplished the parison from the parison molding station to the blow molding station, but these neck rings have generally prevented the neck portions of bottles being molded from being properly conditioned or cooled.

In general, known prior art machines simply do not permit the most efficient utilization of the time that the parison or article spends at each station.

While various means have been suggested to deal with one or more of these problems, there remains the need for a single machine including an integrated solution to these problems with a minimum of compromise. Preferably such a machine should be reliable, adaptable to a wide variety of operating conditions, and relatively small, to facilitate its use as a modular unit for optimum industrial flexibility.

The present invention seeks to answer the problems in the prior art of injection blow molding technology discussed above, and to meet the foregoing need.

SUMMARY OF THE INVENTION

Briefly, the present invention comprises an injection blow molding machine and method wherein a pair of bottle molding cores (also sometimes referred to as mandrels or core rods) or sets thereof, with internally cooled traveling neck ring molds, are transferred from a one piece parison mold to an independently operable split blow mold by a carrier and transfer head, which moves vertically to insert and to remove the core rods into and from the molds and which oscillates through 180°, between such vertical movement, about a center post between the parison and the blow molds. The transfer head also includes means for opening and closing the neck ring molds and for cooling the neck ring molds to facilitate neck conditioning independent of other process functions. Various improvements in means for parison formation, parison conditioning, parison transfer, neck cooling, neck opening, blow molding, and article discharge, among others are herewith provided.

This invention may be better understood by reference to the following detailed description of certain specific embodiments thereof taken in conjunction with the drawings and the appended claims.

BRIEF DESCRIPTION OF THE DRAWINGS

FIG. 4 is a further enlarged sectional view taken through the movable transfer head of this invention, generally along the line IV—IV of FIG. 3, wherein the various fluid passages for operating the neck rings, controlling their temperature, and for delivering air to the blow mold through a core rod, are more clearly illustrated.

FIG. 6 is a somewhat enlarged fragmentary sectional view of the post and head rotatable drive mechanism of this invention, taken generally along the line VI—VI of FIG. 3.

FIG. 7 is an enlarged fragmentary sectional view through a portion of the apparatus of this invention, taken generally along the line VII—VII of FIG. 3.

FIG. 8 is an enlarged fragmentary transverse sectional view of a fluid connection device, in accordance with this invention, taken generally along the line VIII—VIII of FIG. 3.

FIG. 9 is an enlarged vertical sectional view of a portion of the apparatus illustrated in FIG. 4, taken generally along the line IX—IX of FIG. 4.

FIG. 10 is a horizontal sectional view taken through a split traveling ring type neck molding means in accordance with this invention, taken generally along the line X—X of FIG. 9, and wherein full line and phantom positions of the traveling neck ring halves illustrate the closed and open positions thereof, respectively.

More specifically, FIG. 18 is a plan view, similar to FIG. 2, showing the transfer head and associated apparatus in this the preferred embodiment of the present invention.

FIG. 19 is an elevation view of the transfer head shown in FIG. 18.

FIG. 20 is an enlarged, fragmentary sectional view of a portion of the apparatus shown in FIGS. 18 and 19, taken generally along the line XX—XX in FIG. 19.

FIG. 21 is a side view of part of the apparatus shown in detail in FIG. 20.

FIG. 22 is an enlarged, fragmentary sectional view of a portion of the apparatus shown in FIGS. 18 and 19, taken generally along the line XXII—XXII in FIG. 18.

And FIG. 23 is an enlarged, fragmentary sectional view of a portion of the apparatus shown in FIG. 22, taken generally along the line XXIII—XXIII in FIG. 22.

DETAILED DESCRIPTION OF THE INVENTION WITH SPECIFIC REFERENCE TO THE ILLUSTRATED EMBODIMENTS

Figure 1:
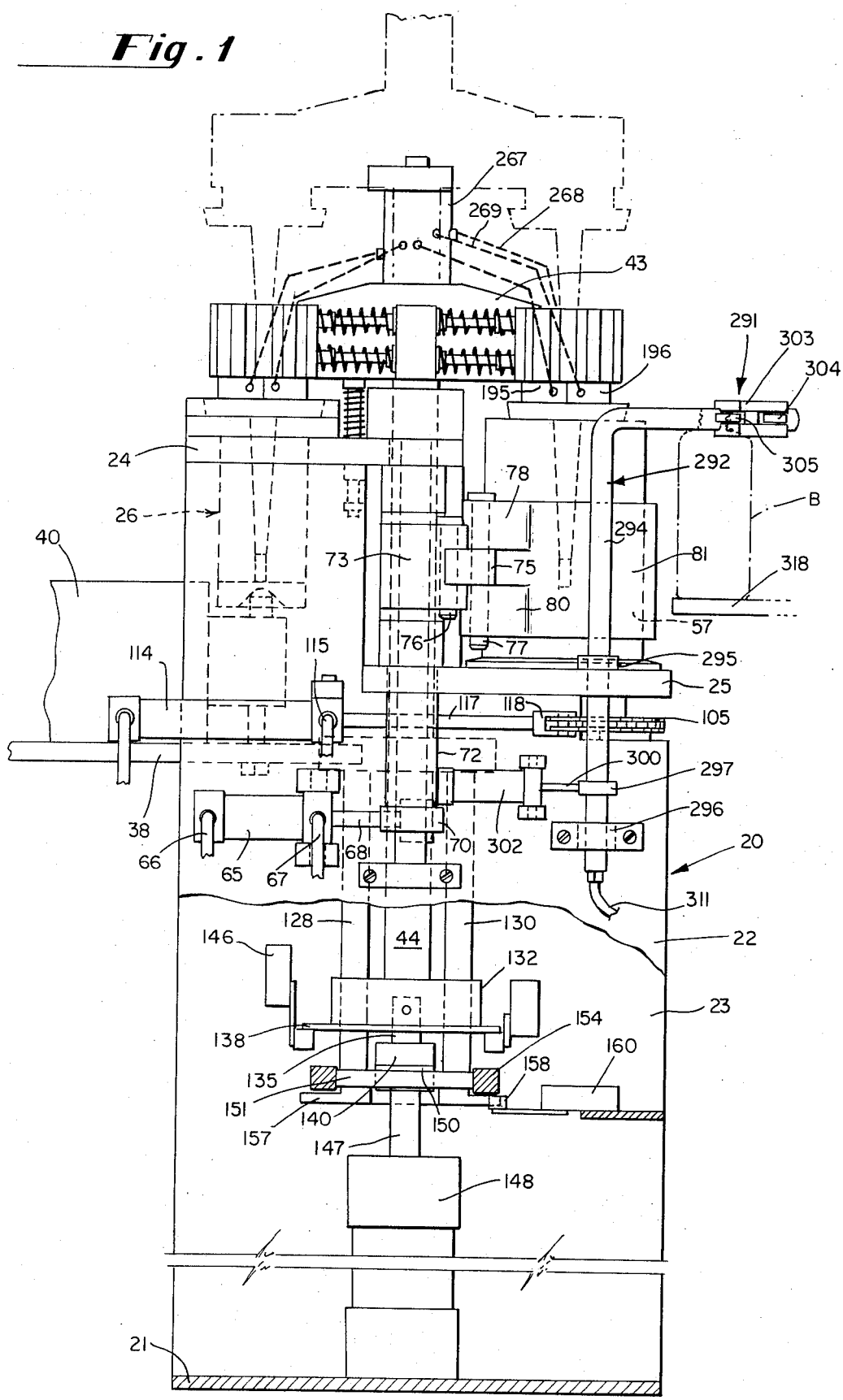
FIG. 1 is a front elevational view of an apparatus in accordance with this invention, with portions illustrated in section for the sake of clarity, and with other portions, such as the vertically movable head, illustrated in phantom, for illustrating another position thereof; namely an upwardly withdrawn position of the head.
Figure 2:
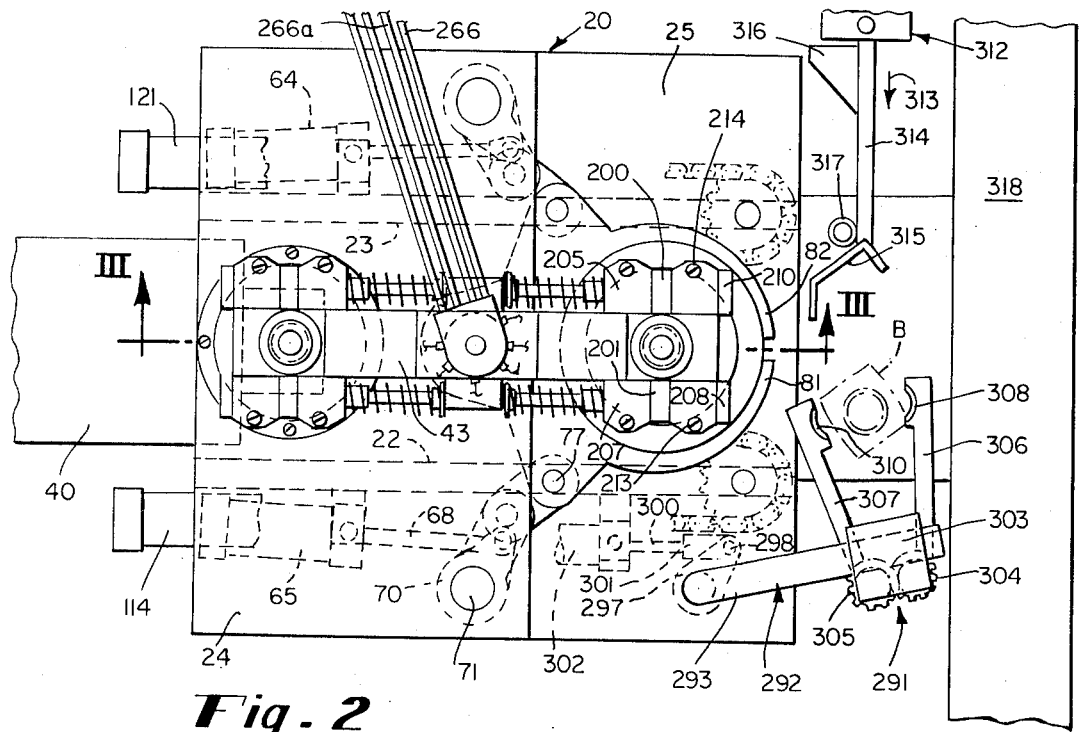
FIG. 2 is a top plan view of the apparatus of FIG. 1.
Figure 3:
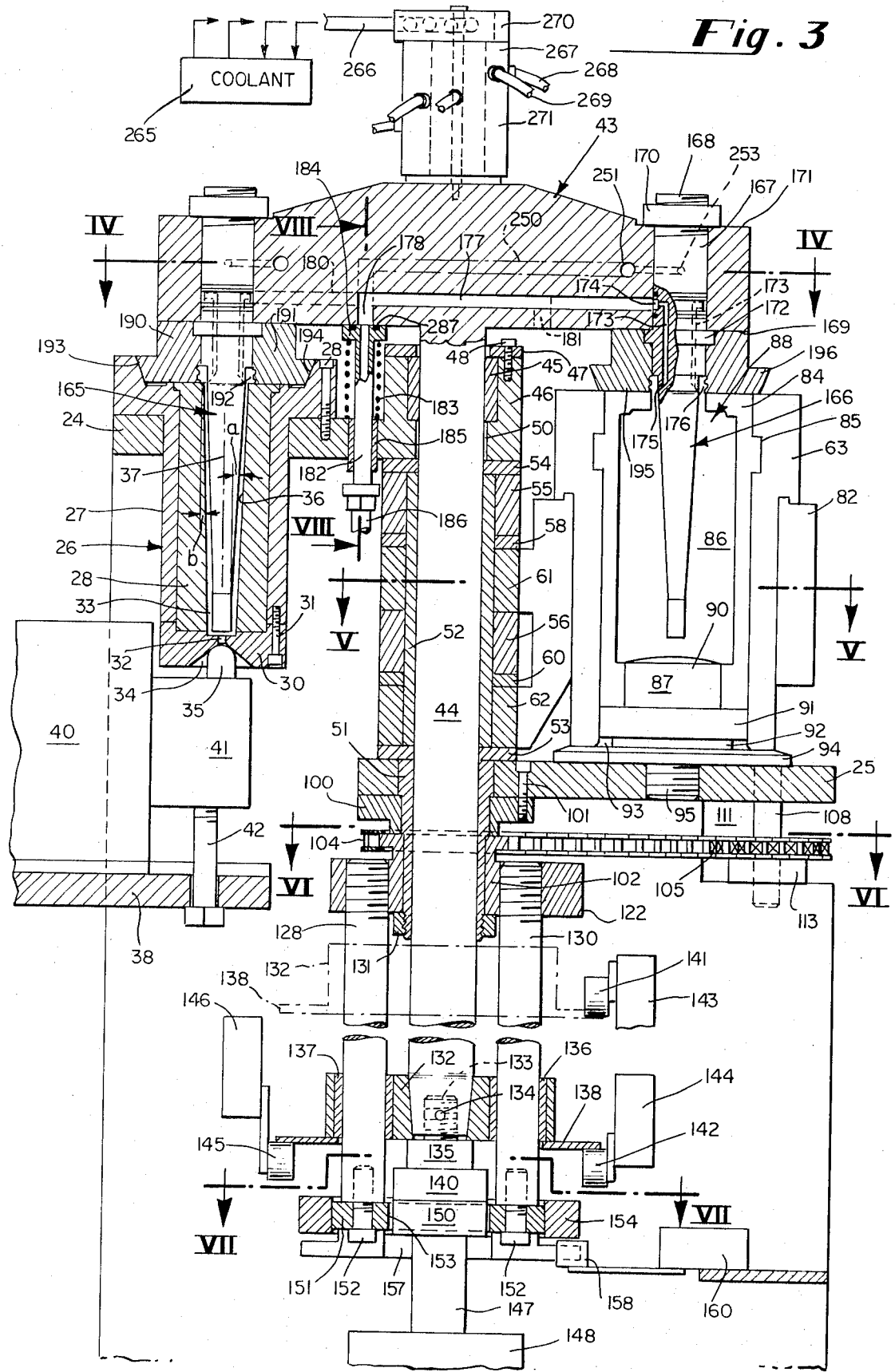
FIG. 3 is a somewhat enlarged fragmentary sectional view of the apparatus illustrated in FIG. 2, taken generally along the line III—III of FIG. 2.

Referring specifically now to FIGS. 1, 2 and 3, there is illustrated, in side, plan and sectional side view respectively, an injection blow molding machine 20 comprising a horizontally disposed supporting plate 21, spaced apart vertical supporting plates 22 and 23, and horizontally disposed top supporting plates 24 and 25, with all these supporting plates being stationary and connected together in some suitable manner by means of bolts, weldments, etc. Thus, the plate 21 is connected to the upstanding plates 22 and 23, and the plate 24 is connected to the upper ends of upstanding plates 22 and 23, and overhangs the upstanding plates 22 and 23, as illustrated in FIG. 2. The plate 25 is similarly disposed at a lower level than that of plate 24, to have the rectangular configuration illustrated also in plan in FIG. 2, overhanging the upstanding plates 22 and 23, at the upper and lower ends of the illustration of FIG. 2.

As best seen in FIG. 3, parison mold 26 comprises an outer section 27 and an inner section 28 press-fit or otherwise suitably secured within the outer section 27. Outer section 27 is bolted or otherwise suitably fixedly secured to the plate 24, as illustrated in FIG. 3. The parison mold 26 has a separable lower end plate 30 removably secured thereto by means of bolts 31 or the like, for receipt of the material to be molded through a bottom inlet 32 thereof, into the parison cavity 33. The bottom of the end plate 30 is chamfered at 34 for centering an injection nozzle 35 relative thereto.

The internal surface 36 of the parison mold may thus be carefully controlled, machined, and especially configured, as desired, simply by withdrawal of the inner section 28 from the outer section 27 of the parison mold, through the upper end thereof. It will be noted that, in the embodiment illustrated in FIG. 3, the internal surface 36 of the parison mold 26 is sloped or tapered (frustoconically tapered) at an angle of "$b$" with a vertical line (or with a line parallel to the longitudinal axis 37 of parison 26) for reasons to be described hereinafter.

It should be noted that the parison mold used in this invention is not split along its length and is therefore referred to as a one piece parison mold.

A support plate 38 is carried between upstanding support plates 22 and 23, and in turn carries a supply and injection means 40, such as a reciprocating extruder screw in a heated housing with a supply hopper for an injection and blow moldable organic resinous thermoplastic material. Means 40 is adapted to injection mold the thermoplastic material, which may consist, for example of polyethylene, polypropylene, polystyrene, polyvinyl chloride, etc., into the parison mold 26. Accordingly, an injection head 41 and nozzle or injector 35 are provided, along with an adjustment screw 42, or other suitable means for maintaining the injector 35 centrally positioned relative to the parison cavity material inlet 32.

A transfer head 43 is provided, mounted to and carried for movement with a generally vertically disposed cylindrical post 44. As best seen in FIG. 3, the post 44 is mounted at its upper end within a bushing 45, for rotation, as well as longitudinal vertical movement relative thereto, with the bushing 45 being secured within a stationary bushing housing portion 46, by means of a lock plate 47 secured thereto by means of suitable bolt type fasteners 48, or the like. It will be noted that the bushing housing portion 46 is stationarily mounted on, or forms a part of a plate 24, as desired, and that a post clearance hole 50 is provided at the lower end thereof, through the plate 24, as is clearly illustrated in FIG. 3.

The lower end of the post 44 is mounted for vertically sliding movement relative to, as well as rotational movement relative to, a stationary lower bushing 51 that in turn is press-fit or otherwise suitably secured to the horizontally disposed stationary supporting plate 25. An elongated vertically disposed cylindrical sleeve bushing 52 is provided, sandwiched between flat washer type thrust bushings 53 and 54 at the lower and upper ends of the sleeve bushing 52, respectively, with all of the bushings 52, 53 and 54 being generally stationary, and with the post 44 being adapted for longitudinal as well as rotational movement relative thereto.

A pair of hinge knuckles or portions 55 and 56 are provided, carried by a split mold half 57 (see FIG. 5, in conjunction with FIG. 3), and disposed about the sleeve bushing 52, for rotation thereabout, and for seating on respective thrust bushings 58 and 60, for rotative sliding thereagainst. Similarly, another pair of knuckles 61 and 62 are mounted for pivoting or rotation about the sleeve portion 52, and are carried by the opposite split mold half 63. It will thus be clear that the split mold halves 57 and 63 are adapted for hinge-like opening, as their associated knuckles are pivoted about the stationary sleeve 52.

Figure 5:
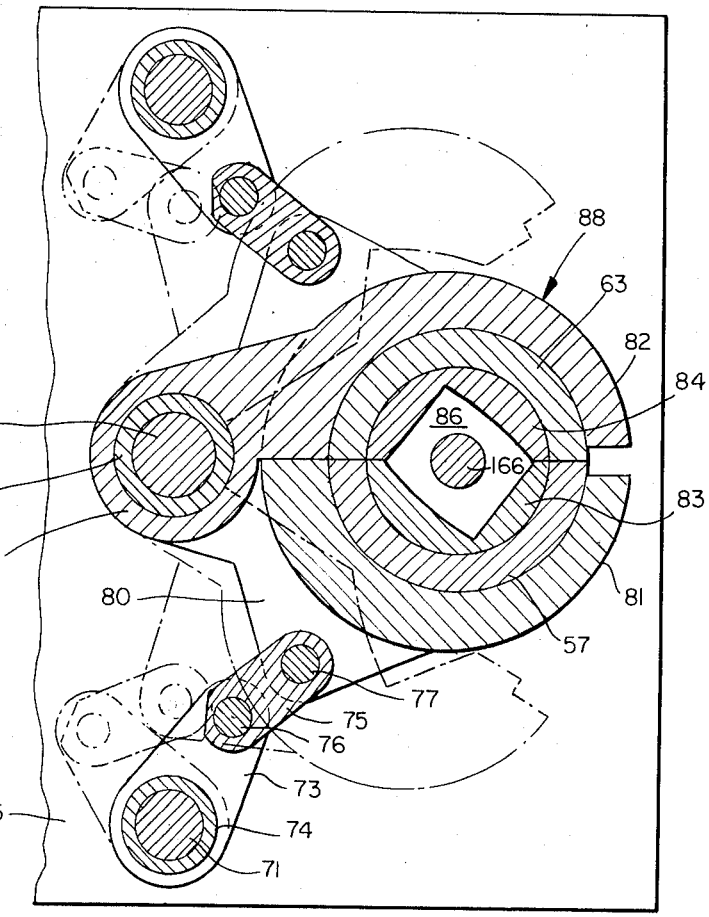
FIG. 5 is an enlarged fragmentary transverse sectional view, taken through the blow mold of this invention, generally along the line V—V of FIG. 3, and wherein some of the mechanism for opening the split blow mold is more clearly illustrated.

The split mold halves 57 and 63 may be moved open and closed by the use of hydraulic operative piston cylinders 64 and 65 disposed on opposite sides of the apparatus 20, as illustrated in FIG. 2, with closing and opening oil, respectively, being provided (as illustrated in FIG. 1) at ports 66 and 67 thereof. Because the cylinders 64 and 65 operate similarly, only one need be discussed in detail herein. The cylinder 65 therefore is provided with a piston therein that is adapted for driving a rod 68, that in turn, is in pivotal engagement with a link 70, for driving the link 70 and in turn for pivotally driving a shaft or post 71 (not seen in FIG. 1) that is press-fit or otherwise suitably secured to the link 70. The shaft 71 is suitably mounted for rotation within a bushing type sleeve 72 or the like, that in turn, is carried by the fixed horizontal plate 25. With particular reference to FIG. 5, it will be seen that as the shaft 71 is caused to pivot by actuation of the cylinder 65, the link 73 secured thereto by means of its hub 74 being also pinned or otherwise suitably secured to the shaft 71 also pivots, with the link 73 being pivotally pinned to another link 75 by means of a pin 76, and with the link 75 being further pivotally pinned by means of a pin 77, to yoke portions 78 and 80 of the split mold half 57. As has been mentioned above, the mold half 63 is similarly actuated, such that the various components thereof, as well as the mold halves, are movable between the full line and phantom positions illustrated in FIG. 5, depending upon whether the cylinders 64 and 65 are actuated from their drive or closing ends 66, on the one hand, or from their retraction or mold-opening ends 67 thereof.

The blow mold halves 57 and 63 are thus carried within pivotally movable arms 81 and 82, each of which have yoke portions such as those 78 and 80 driven by a link such as that 75 connected thereto by a pin such as that 77. The actual split mold half portions 57 and 63 are thereby housed within the arm portions 81 and 82, respectively.

The split mold half portions 57 and 63 are also provided with specially configured blow mold insert portions 83 and 84, respectively, bolted or otherwise suitably secured within corresponding outer portions of the blow mold halves 57 and 63. The inserts 83 and 84 may be provided with shoulders such as that 85, illustrated in FIG. 3, to prevent motion of these insert portions.

The interior cavity 86 of the blow mold may be constructed and configured as desired, to conform to the shape of the exterior surface of any desired bottle, container or the like.

A bottom portion 87 of the blow mold 88 may comprise an upstanding portion 90 having an upper surface that forms the bottle bottom-forming portion of the interior of the blow mold cavity 86, that is of reduced diameter compared to a shoulder portion 91, but which is fixedly secured thereto, for conformity of the mold insert portions 83 and 84 thereabout, and for seating of such mold insert portions 83 and 84 on the shoulder portion 91. Beneath the shoulder portion 91 there may be a reduced diameter portion 92, for providing a relief 93 for facilitating assembly, and with an enlarged diametral portion 94 being provided for seating of the outer portions of the split mold halves 57 and 63 thereon as illustrated in FIG. 3. The portions 91 and 94 may be of unitary one-piece construction, and may have a threaded portion 95 protruding therefrom, for screw-fitting relation into the fixedly positioned horizontal support 25, as illustrated in FIG. 3.

With reference to FIGS. 1, 3 and 6, in particular the mechanism for providing a rotational drive to the post 44 will now be described.

A stationary sleeve 100 is provided, secured to the horizontal plate 25, as illustrated in FIG. 3, by means of suitable bolt type fasteners 101 or the like, for retaining the fixed sleeve bushing 51 in place within the fixed support 25. Another sleeve 102 is rotationally mounted on, and relative to the lower end of the fixed sleeve 51, with the sleeve 102 having sprocket teeth 103, either integrally constructed therewith, or press-fit or otherwise secured thereto, for movement with the sleeve 102 about the bushing 51. The sprocket 104 is driven by a suitable conventional chain 105 that passes around idler sprockets 106 and 107 carried by suitable shafts 108 and 110, respectively, for rotation thereabout, with the shafts 108 and 110 being fixedly mounted in notches or openings 112 in the upstanding supports 23 and 22, respectively. The shafts or posts 108 and 110 may be provided with suitable shoulder members 113 for carrying the sprockets 106 and 107 in seated relation thereon, for rotational movement relative thereto.

The chain 105 may be driven by actuating a hydraulic piston cylinder 114, for example by providing pressurized oil to a port 115 thereof, that will cause retraction of the piston rod 116, for movement in the direction indicated by the arrow 117, relative to the fixedly mounted cylinder 114.

The right-most end of the rod 117 is suitably connected to a suitable yoke 118 or the like, that in turn, is connected to one end of the chain 105, as illustrated in FIG. 6, for driving the chain in the direction indicated by the several arrows in FIG. 6, such that the idler sprocket 106, as well as the idler sprocket 107 are driven in a clockwise direction illustrated by the arrows associated therewith in FIG. 6, and with the chain 105 driving the sprocket 104 in the counter-clockwise direction illustrated by the arrow 120 in FIG. 6.

While not described in detail herein, it will be apparent that another hydraulic cylinder 121 is provided, to be worked in conjunction with the cylinder 114, such that the piston in one cylinder will be driven in one direction while the piston in the other cylinder will either be driven in the reverse direction, or allowed to move therewith. It is thus apparent, that by actuating the cylinders 114 and 121, in alternate fashion, such that first one cylinder such as that 114 pulls the chain 105 theretoward, and then actuating the other cylinder 121 such that it pulls the chain 105 theretoward, the sprocket 104 and the member 102 will undergo a reciprocating back-and-forth motion.

It will be noted, that if desired, rather than having the post 44 move in a reciprocating back-and-forth intermittent motion, the device of this invention could be adapted for providing a clutching arrangement for the sprocket 104, such that only a single drive such as that 114 would be necessary, with a spring-type return for the chain 105, during disengagement of a clutch, and with the drive being actuated during engagement of the clutch, for driving the post 44 rotationally by the movement of the sprocket 104. However, such is an alternative to the back-and-forth type of rotational drive disclosed in detail above.

The rotationally movable member 102 has an enlarged extension portion 122 constructed as illustrated in FIG. 6, and extending over less than half the periphery of the member 102, terminating in abutment ears 123 and 124 that are adapted to abuttingly engage against respectively associated ends 125 and 126 of a fixed block 127 carried by the upstanding support 22, fixedly therewith. Thus, it will be clear that, upon energizing the cylinder 114, as aforesaid and moving the chain 105 in the direction of the arrow 117 illustrated in FIG. 6, the ear 124 will be swung around through an arc of 180° (precisely for careful control), to abuttingly engage against the end 126 of the block 127, for an abrupt stopping upon the post being rotated in a precise amount. Conversely, when the cylinder 121 is drivingly actuated, with the cylinder 114 being reversely actuated, or merely deactivated to allow the movement of the chain 105 in an opposite direction, the ear 123 would again be swung into the position illustrated therefor in FIG. 6, to abuttingly engage the end 125 of the block 127, for reverse pivoting or rotational movement of the post 44 an opposite precisely controlled 180°.

During rotational movement of member 102, a pair of vertical guide posts 128 and 130, threadably mounted thereon as illustrated in FIGS. 3 and 6, also are carried through a correspondingly precisely controlled 180° arc.

It will be noted that the fixed bushing 51 has a threaded lower end, with a nut 131 secured thereto, for maintaining the vertical position of the rotatable member 102 slidably received thereon, with the bottom surface of the member 102, as illustrated in FIG. 3, being in sliding thrust engagement against the nut 131, and with the nut 131 therefore functioning as a thrust washer.

The lower end of the post 44 is press-fit or otherwise suitably received within a tapered bore of a plate 132, tightly secured therein by means of a threaded member such as a screw or the like 133 being secured through the lower end thereof, and pinned in place by a pin 134 as illustrated in FIG. 3, with the head 135 of the threaded member 133 being sufficiently large in diameter to traverse the lower end of the tapered ore of the plate 132. Thus, the lower end of the post 44 is in tight wedged engagement for movement with the plate 132. The plate 132 has a pair of sleeves 136 and 137 press-fit or otherwise suitably fixedly secured therein, that in turn are longitudinally slidable along the vertically stationary posts 130 and 128, respectively. A plate 138 is also fixedly carried by the plate 132 for movement therewith. Thus, it will be clear that the plate 132, the sleeves 137 and 136, and the plate 138, as well as the screw head 135 and abuttment block 140 carried thereby, are fixed for movement together, as a unit, with there being no relative movement between any of these parts, either in the vertical or longitudinal direction, or in a rotational direction.

The plate 138 is of ring-like configuration in plan, and has outer edge portions adapted to engage rollers 141, 142, and 145 of upper and lower limit switches 143 and 144, respectively, for indicating upward or downward vertical position of the post 44. The ring-like construction of the plate 138 assures that, regardless of its angular position, it will always be disposed for contacting any of the rollers 141, 142, and 145, upon the plate 138 reaching a vertical position wherein contact is desired with one of the switches 143, 144 or 146.

A ram 147 is provided, as a component of, or connected by any suitable means to a rod driven by a piston disposed within a cylinder 148, for driving the ram 147 upwardly and retracting the ram 147 downwardly, depending upon the direction of the drive of the piston (not shown) within the cylinder 148. Thus, oil may be provided by any suitable means to one end or the other of the cylinder 148, as dictated by the plate 138 striking the rollers 141 and 142 of the switches 143 and 144, respectively. Switch 143 indicates that the core rod head is up and initiates the core rod head oscillation function.

Switch 144 indicates that the core rod head is down and initiates the machine injection function.

At the upper end of the ram 147, a block 150 is provided, that, together with the block 140, comprises a coupling adapted to move together, upward and downward, with the member 140 being driven by the member 150, which in turn is driven upward and downward by the ram 147. While member 150 is fixed against rotation about the axis of post 44, sliding rotational movement of member 140 relative to member 150 is permitted so that while member 140 is raised and lowered by member 150, it is free to rotate without transmitting rotational movement to member 150. Couplings permitting such movement are commercially available.

A ring 151 is bolted to the lower ends of the posts 128 and 130 by suitable threaded member 152, for rotary motion therewith, but in a fixed vertical position. The member 151 is slidably received within a round bore 153 of a fixed plate 154, with the fixed plate 154 in turn being carried between upstanding plates 22 and 23. It will be noted that the center of the ring 151 is provided with a clearance hole 153 for freedom of vertical movement of the member 150 therethrough.

A switch actuating arm 157 is bolted or otherwise suitably carried by the ring 151, as indicated in FIGS. 3 and 7, for rotational movement therewith. The purpose of this is for the member 157 to actuate a roller 158 of a switch 160. Thus, with the sprocket 104 having the enlarged portion 122 thereof in the position illustrated in FIG. 6, the bar 157 is in the position illustrated in FIG. 7. Conversely, if the sprocket 104 is rotated 180° in the direction of the arrow 120 of FIG. 6, the bar 157 will also be rotated through 180°, such that an opposite end thereof will strike the roller 158 for actuating the switch 160 for indicating movable transfer head 43 location. Also, the limit switch 143 may be used as a safety device preventing actuation of cylinders 121 and 114, as desired, such that only when the head 43 is moved to a desired upward position, with the core rods thereof clear of the mold cavities, will the post 44 be rotated. Similarly, after the rotation of the post 44 through an arc of 180°, switch 148 is used to initiate downward retraction of the post 44, for positioning of the core rods within the mold cavities. It will thus be apparent that the various switching devices are used in conjunction with timers, or are directly responsive to various positions of the various elements of this invention, in order to produce a desirably timed sequence of operations, with little or no loss in time between stages or operations.

With reference now to head 43 (as best seen in FIG. 3), it will be noted that head 43 carries a pair of equidistantly angularly spaced core rods 165 and 166, diametrically opposite each other, or 180° apart, corresponding to the position of mold cavities 33 and 86.

The core rods 166 and 165 are identical in construction, so only one need be described in detail.

Core rod 166 includes a post 167, threaded at its upper end 168, with a nut 170 secured thereto, against a clamp surface 171 of the head 43, and with a lower portion of the post 167 having a shoulder 172 in abuttment against a lower surface 169 of the head 43.

Core rod 166 is provided with a plurality of longitudinal blow air passageways 173, opening into an annulus 174 at their upper ends, and having their lower ends opening into a neck-forming annulus 176 as illustrated in FIG. 3. The annular void 174 is in communication with a generally horizontally disposed blow air duct 177, that in turn is in communication with a generally vertically disposed blow air duct 178 that will be connected to a source of blow air as will be hereinafter described. Similarly, another horizontally disposed blow air duct is similarly arranged with respect to supplying air to a core rod 165 from a vertical supply duct 181 upon rotation of the head 43 through an arc of 180° from the position illustrated in FIG. 3. Thus, it will be apparent that one or the other of the vertical ports 178 and 181 will be in communication with a blow air supply line 182, depending upon which position the head 43 is in at any given time; namely that illustrated in FIG. 3, or 180° relative thereto, but that, at any given time, only the core 165 or 166 that is disposed within the blow mold cavity 86 will be properly oriented for being supplied with blow air from the line 182 illustrated in FIG. 3 and also seen in FIG. 8.

It will be noted that the line 182 comprises a tube that is spring-biased upwardly, by a spring 183, and is provided with a seat or abuttment surface 184 at its upper end for positive communication with the port 178 or 181, during vertically downward movement of the head 43 just as the head 43 approaches its downward terminal position of movement, with the appropriate core within the blow mold cavity 86. Accordingly, the tube 182 is adapted to slide vertically within a bushing 185 that in turn is carried within fixed plate 24, and with the lower end 186 of the tube 182 being connected to a suitable source (not illustrated) of blow air that is supplied upon actuation by any suitable switch indicating that the core that is disposed within the blow mold has reached its downward position, as desired. Also, the upper end of the abuttment member 184 may be provided with a suitable gasket 287, for sealing purposes or the like, as desired.

It will be noted that each of the core rods 165 and 166 may be either of the spring-loaded-closed or spring-loaded-opened type. By this, it is meant that the lower ends of the core rods below the opening ports 175, in the spring-loaded-closed type will be shut throughout the parison molding stage, and will be opened only when the pressure within the line 177 or 180 reaches a sufficient level to move the lower end of the core rod downwardly in order to permit passage of air through the ports 175. In the opposite type of core rod, namely the spring-loaded-opened type, such ports 175 would be open even when the core rods were disposed within the parison-molding cavity 33, but that the pressure of the moving thermoplastic material being injected into the cavity 33 would force that portion of the core rod disposed below the ports 175 to move upwardly relative to the upper end of the core rod, in order to close the ports 175 in order that the same would not become filled with thermoplastic material. Such forcing would be against the urging of a spring (not illustrated). Upon removal of the core rod from the parison mold, and delivery to the blow mold, the spring pressure would take over, due to the absence of an overwhelming pressure in opposition, and force the opening of the ports 175 once again, for blowing of air therethrough. However, such features of the core rods are not the specific areas of novelty of the present invention, and accordingly, are not disclosed with great particularity herein.

The core rods 165 and 166 of this invention are constructed to be substantially elongated, of increased depth, over and above those conventionally available, in order to permit the construction of deeper hollow articles, such as taller bottles or the like.

In a machine of the type disclosed herein, one of the problems attendant to the construction of deeper bottles is that of facilitating the removal of the molded parison from the one piece parison mold, without, at the same time causing degradation (or "slumping") of the semi-molten parison from the core rod as it is cooled and transferred to the blowing station. It should be noted that both the core rod and the parison mold are parison molding surfaces, and usually they are approximately parallel along the parison sidewall so as to provide a uniform wall thickness in the finished blown product. The problem then is one of facilitating parison separation from the sidewall mold surface and maintaining accurate parison configuration. This problem is aggravated by the fact that the parison is withdrawn along its axis which is generally parallel to the parison sidewall. The longer this sidewall, as in parisons and bottles with a high length to diameter ratio, the greater this problem. It has been met, in the present invention, by tapering slightly the parison mold sidewalls, the degree of this taper being shown as angles "$a$" and "$b$," respectively, in FIG. 3. Most importantly angles $a$ and $b$ must be minimized. Generally, these angles must not exceed 2°. The preferred and minimum limit for these angles is about ½°. Within these limits, substantially deeper articles may be constructed by rapid and efficient injection molding of parisons followed by transfer and blow molding of the parison.

Additionally, it may be desirable to further condition the parison by including cooling capabilities internally of the lower portion of the core rods 165 and 166; namely those portions below the air inlet openings 175, for example, and to additionally, or alternatively provide internal cooling (such as oil or other fluid cooling), in the parison mold cavity 28. However, such features are not within the essence of this particular invention and accordingly are not described in detail herein.

Another important feature of this invention resides in the use of traveling neck rings or molds, as well as in the particulars of their construction and operation. A significant aspect of these traveling neck rings is the provision therein for circulating a heat transfer fluid to permit the conditioning of the neck portion of a parison independent of other process and machine functions.

With reference to the left-most side of FIG. 3, at the upper end thereof, a pair of neck ring halves 190 and 191 are provided, carried by the upper end of the core rod 165, beneath the head 43 thereof.

The inner surfaces of neck ring halves 190 and 191 cooperate with core rod 165 to define an annular neck shape, specifically configured portion 192, often, as in the design shown in FIG. 3, defining external threads for bottles adapted to have threaded caps secured thereto.

The outer peripheries of the neck ring molding portions 190 and 191 will aggregately define a frusto-conically configured surface 193, adapted to matingly engage within a complementally configured frusto-conical, or outwardly chamfered surface 194, as illustrated, at the top of parison mold 26. This mating design of split neck rings 190 and 191 and parison mold 26 assures closure of split neck rings 190 and 191 about their parting surface. It also assures positive seating and central positioning of core rod 165 within parison cavity 33. Thus, it is seen that this frusto-conically tapered mating configuration for the split traveling rings provides a highly desirable process feature in facilitating even distribution of the parison about the parison core rod 165.

Similar traveling ring type neck molds are provided for each of the core rods 165 and 166. Accordingly, only a single set of such molds need be discussed in detail. Reference is therefore made to FIGS. 4, 9 and 10, and to the neck molds and associated apparatus shown in conjunction with core rod 166 therein. These split traveling neck rings or molds 195 and 196 are carried for movement on the right end of the head 43, as illustrated in FIG. 4; there it will be seen that a pair of rectangular block-like members 200 and 201 are provided fixedly carried by the right-most end of the head 43, with inner-most portions thereof, 202 and 203, respectively engages within vertical slots on opposite sides of the right-most end of the head 43. These rectangular members 200 and 201 are thus carried by the head 43, and undergo no movement relative thereto. The member 200 has cylindrical projections 204 and 205, extending rightwardly and leftwardly, with reference to FIG. 4, and the member 201 has similar cylindrical projections 206 and 207. A pair of generally rectangular blocks 208 and 210 have bores 211 and 212, respectively therein, and which bores are disposed over the cylindrical projections 206 and 207, for sliding movement therealong, as the member 196 moves from the full line position illustrated in FIG. 9, to the phantom line position thereof. The members 208 and 210 are connected to the traveling ring half 196, by suitable pins, threaded members or the like 213 and 214.

Each of the members 201 and 200 are provided with a pair of vertically spaced sleeve bushings 215 and 216, that are fixedly positioned relative to whichever member 201 or 200 they are associated with, and do not move relative thereto. Members 217 and 218 which are complemental counterparts of those 208 and 210 are disposed for sliding along bushings 215 and 216 against the force of an associated vertically spaced pair of cylindrical compression springs 220 and 221.

A pair of vertically spaced guide posts 222 and 223 are also provided for each of the members 200 and 201, arranged as illustrated in FIG. 9, with each of the posts 222 and 223 being slidable within one of the bushings 215 and 216, for movement in conjunction with rightward and leftward movement of the member 208 (with reference in particular to the sectional view of FIG. 9), it being understood that the construction and operation with respect to the member 210 is similar. Posts 222 and 223 include shoulders 224 and 225, respectively, in abutment against left-most ends of the member 208 (the construction with respect to the member 210 is identical), and with reduced shank portions 226 and 228 of the guides 222 and 223 being fastened by a threaded connection with nuts such as those 230. It is thus seen that rightward movement of the guides 222 and 223 will be opposed by the springs 220 and 221 as well as by the springs 231 and 232. The springs 231 and 232 have their right-most ends as illustrated in FIG. 9 in abutment against the left-most ends of the fixed bushings 215 and 216, respectively. The left-most ends of the springs 231 and 232 are in engagement against a pair of collars 233 and 234 that are fixedly carried on the guides 222 and 223, as illustrated. Washers 235 and 236, backed up by snap rings or other suitable connections engage the left-most ends of the springs 220 and 221. The left-most ends of the guides 222 and 223 are slidably received within respectively associated bushings 238 and 240 carried within a block 241 that in turn is carried at the center of the movable head 43. A similar block 242 is disposed at the opposite side of the head 43 from that 241, for similarly accommodating guides likewise constructed for facilitating movement of members 218 and 210, in a manner similar to the movement of members 217 and 208 discussed herein above. It is thus clear that as the members 208 and 210 move from the full line position illustrated in FIG. 9, to the phantom line position thereof for the traveling neck ring half 196, the guides move from the position thereof illustrated in FIG. 9, out of their blocks 241 and 242, in order to accommodate such righward movement of the traveling neck ring half 196. Similarly, when the traveling neck ring half 195 moves leftward, to the phantom line position illustrated in FIG. 9, the members 217 and 218 move leftward along the bushings 215 and 216.

With reference to FIGS. 3 and 8, as the head 43 is moved vertically downwardly toward a seating position of the core rods relative to the molds, the lower-most end of the head portion 43, illustrated in FIG. 8, comes into contact with an abuttment portion 245 at an upper end of a pressurized air inlet 246. The members 245 and 246, as well as the compression spring 247 are constructed and arranged similar to those 184, 182 and 183, discussed herein above. Accordingly, upon engagement as aforesaid the member 246 is adapted to be moved vertically downwardly an amount to assure proper registration of the inward line 246 with an air inlet port 248, that is vertically disposed and adapted for distributing air to a horizontal distribution line 250. The actual flow of pressurized air may be initiated by a delay timer that may be set to open the opposed halves such as 195 and 196 of the traveling neck rings, at a predetermined time after the seating of the cores, as for example, after actuation of the switch 146 by the striking of the roller 145 thereof by the descending member 138. Such timing may be pre-set in accordance with any desired end result insofar as the timing of the opening of the traveling neck ring halves is desired. Also any other suitable manner of actuating the inlet of driving air or like pneumatic fluid through the port opening 248 from the inlet line 246 thereof may be utilized as desired.

In any event, with the right-most end of the head 43 as illustrated in FIG. 4, air will be provided into the horizontal line 250, from the inlet 248 thereof, to be delivered to the right-most end of the head as illustrated in FIG. 4, wherein such delivery is split into forks 251 and 252, for delivery outwardly into members 204 and 206, through inlets 253 and 254, for delivery through each end of the continuous bores 255 and 256 of the members 204, and 206, respectively, whereby such air will meet resistance from blind bore portions 257, 258, 260 and 261, with such resistance causing a build-up of back-up pressure, with increased delivery of air through the line 250, such that the members 208, 210, 217 and 218 are moved outwardly along the members 200 and 201 upon which they are mounted, thereby carrying the split traveling neck portions 195 and 196 bolted thereto as aforesaid, apart, from the full line positions as illustrated in FIG. 9, to the phantom line positions thereof, against the compression provided by the springs 220, 221, 231 and 232.

It will be apparent that, upon rotation of the head 43 from the position illustrated in FIG. 4, to a position 180° therefrom, the compressed fluid delivered through the line 246 will be supplied through the vertical port 262, through the horizontal delivery channel 263, etc. to the mechanism illustrated at the left-most end of the head 43 as illustrated in FIG. 4, which components would then be at the right-most end as illustrated in FIG. 4. Accordingly, the arrangement of the ducts is such (as seen in FIGS. 3, 4 and 8) that working air for spreading the traveling neck rings can only be delivered to whichever one of the core rods 165 and 166 is disposed within the blow mold cavity 86, and not when such core rods are disposed within the parison cavity 33.

It will further be apparent that the timing of the opening of the split traveling neck ring portions such as those 195 and 196 must be carefully controlled in that such neck ring portions will be in contact with neck portions of the bottle or other articles being molded for as long a time as possible, but with the neck ring portions 195 and 196 being separated an amount to completely clear the then formed neck of an article prior to any movement in the vertical upward direction whatsoever for the head 43, in order that such neck portions of the article being formed are not damaged. Also, the traveling neck ring portions 195 and 196 must stay in such open position at least until the molded neck of the bottle or other article has been cleared, and then may be permitted to retract to the full line positions thereof illustrated in FIG. 9, during the remainder of the upward movement of the head, while the core rods clear the molds. It will be apparent that any suitable timing arrangements may be desired.

Provision is also made herein for conditioning the formed neck portions of bottles or articles, both during the traveling from the parison mold 26 to the blow mold 88, and during the presence of the article in the blow mold 88, both during and after its blowing thereof. Such provision is in the form of the provision of a source 265 of coolant, such as cooling oil, for delivery to the area of the neck-forming portions of the split traveling neck rings, for facilitating the cooling and solidification thereof. This conditioning or cooling can be highly useful particularly in the formation of threaded necks of bottles, wherein the additional mass of material which is necessary in that portion of the bottle to withstand threading of a cap or the like thereonto, presents more difficulties in the formation thereof because such increased mass in a relatively large bulk, compared with a cross-section for example at any other location of a bottle being formed, takes longer to cool and therefore longer to solidify, thereby often substantially increasing the time cycle of formation. However, with the capability of providing coolant from a source 265, through a line such as that 266, for delivery through a device 267, to an outlet line such as that 268, to the traveling neck rings 195 and 196, a highly advantageous feature is provided for continued conditioning of the neck portions of articles being formed. The device 267 is of a type that will enable rigid connections to the top portion 270 thereof, but which will enable the bottom portion 271 to rotate relative to the fixedly positioned top portion 270, such rotation of the bottom portion 271 being with the rotation of the head 43.

However, the device 267 is of the type that fluid delivered from a line 266, may be drawn off from a line 268, without being mixed with other fluid delivered through the device 267. It will be uderstood that fluid may be delivered in one direction through a line 266, to the line 268, and may be returned from another one of the lines 269, to a different one of the lines 266a, and with the delivery and return being similar for the opposite neck ring halves 190 and 191, through other lines.

With particular reference to FIGS. 9 and 10, it will be clear that fluid may be delivered to fluid inlet ports 280 and 281 (generally horizontally disposed), then downwardly through vertical ports 282 and 283, respectively, then around arcuate delivery channels 284 and 285, to then be delivered to vertical outlet ducts 286 and 287, and then to horizontal outlet duct portions 288 and 290, then to return lines such as fluid line 269, back to the source 265 of the coolant. The lines such as 268 and 269 are flexible, in order to accommodate movement of the traveling neck ring portions 195 and 196 between the full line and phantom line positions illustrated in FIG. 9. It will therefore be seen that the device of this invention provides a mechanism for cooling or otherwise conditioning the neck portions of articles being formed by allowing the passage of a coolant or other fluid close to such neck portions, but within the bodies of the traveling neck ring halves 195 and 196.

With particular reference to FIGS. 1 and 2, it will be seen that there is provided a bottle removing mechanism 291, for removing a bottle (or other blow molded article) "B" from the split blow mold 88.

The mechanism 291 comprises a bar 292 of inverted L-shaped configuration, as illustrated in FIG. 1, having a horizontal leg 233 and a vertical leg 294. The vertical leg 294 is rotationally mounted in a bushing or the like 295 carried by the plate 25, for freedom of rotation therein, and in a bushing, pillow block bearing or the like 296, at its lower end. A link 297 is fixedly secured to the vertical rod section 294, as illustrated in FIGS. 1 and 2, for driving movement therewith, with the other end of the link 297 being pin-connected at 298 to a rod 300, by means of a suitable connecting yoke 301 or the like, and with the rod 300 being suitably driven from the pneumatic cylinder 302 which drives a piston or the like (not shown) to which the rod 300 is connected. The cylinder 302 is provided with driving air or the like, an any suitable manner and is carried on the vertically disposed supporting plate 22.

At the upper end of the device 291, a drive head 303 is provided, having a pair of gears 304 and 305, that may be driven toward and away from each other in any suitable manner not forming a part of this invention, for driving a pair of gripping arms 306 and 307 toward and away from each other, for gripping the neck of a bottle or like article "B," with gripping portions 308 and 310. The gears 304 and 305, or any other suitable motion delivery mechanism may be actuated by a pneumatic, or electrical source 311 delivered thereto through the L-shaped rod 292, as may be desired. Thus, upon actuation by the actuating source 311, the arms 306 and 307 are pivoted toward each other, whereby their engagement portions 308 and 310 engage the neck of a bottle "B." Such will, of course, occur after the traveling neck rings have been spread open and with the head 43 having been lifted vertically upwardly, at least an amount to enable the arm 292 to have been swung from the position thereof illustrated in FIG. 2, to a position of counter-clockwise angular movement relative thereto, whereby the gripping portions 308 and 310 will have gripped the neck of a bottle that will then be protruding upwardly outwardly of the blow mold 88, such angular movement of the arm 292 having been provided by actuation of the cylinder 302, in accordance with some pre-set timing sequence, or by virtue of a switch or the like having been tripped by upward movement of the head 43, as desired. The bottle B will then be moved to the position thereof illustrated in FIG. 2, between the arms 306 and 307, with the L-shaped support bracket or arm 292 being returned to the position illustrated in FIG. 2.

It will be understood that the split mold halves 57 and 63 will first have been opened, after the engagement of the neck of the bottle B by the arms 306 and 307, but prior to pivotal movement of the L-shaped arm 292 for movement of the bottle B outwardly of the mold, in order that the mold will be in an open position for facilitating such lateral outward movement.

With the bottle B in the position thereof illustrated in FIG. 2, a cylinder-actuated pusher 312 may be utilized, that is movable in the direction of the arrow 313, illustrated in FIG. 2, by any suitable source, that will be tripped upon the arm 292 reaching the position thereof illustrated in FIG. 2, such that a rod 314 will be driven by a cylinder or the like, in the direction of the arrow 313, for engagement of a side wall portion of the bottle B by a scoop portion 315 of the device 312, then followed by lateral or a rightward component of motion for the bottle B, (with reference to FIG. 2), such that a cam or the like 316 carried on the rod 314, will engage a roller 317, for facilitating a rightward lateral component of motion for the bottle B, for delivery of the bottle B onto a moving conveyor 318. It will be understood that the operation of the mechanism 312 may be controlled by a timing device, or in response to the motion of the arm 292, for actuating the motion of the mechanism 312 as aforesaid at precisely the right time. It will further be understood that the device 312 is then retracted to the position illustrated therefor in FIG. 2.

OPERATION

Certain of the operational features of the apparatus of this invention will now be described in sequence, in order to facilitate an understanding of the broader operational inter-relationship of the various components discussed above. Accordingly, with reference to FIGS. 11 through 17, the basic operation of the apparatus described above will be clearly understood.

Figure 11:
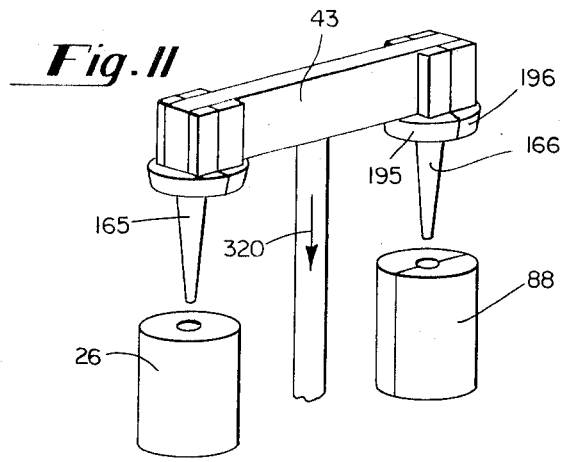
FIGS. 11 through 17 illustrate in schematic perspective, sequential stages in the use of the machine of this invention.

With particular reference to FIG. 11, it will be seen that a parison mold 26 and a split blow mold 88 are provided, with core rods 165 and 166 carried by a head 43, aligned thereabove. The head 43 will then be moved vertically downwardly in the direction of the arrow 320, to place the core rods within the mold. The mold material will then be injected into the mold 26 through the bottom thereof, from the injection head 41, and the various parison cooling functions will be operative. After completion of a timing cycle, the head 43 will be raised vertically upwardly in the direction of the arrow 321 of FIG. 12, withdrawing the core rods 165 and 166 from their then respectively associated molds 26 and 88. I will be noted that at this point, nothing has been happening in the mold 88, but that a parison "P" is carried on the core rods 165, as the core rod is withdrawn from the mold cavity 26. The head 43 is then rotated through an arc of 180°, in the counter-clockwise direction illustrated by the several arrows in FIG. 13, to dispose the core rod 165 with the parison P carried thereon above the blow mold 88, and of course to dispose the core rod 166 above the parison mold 26.

Figure 15:
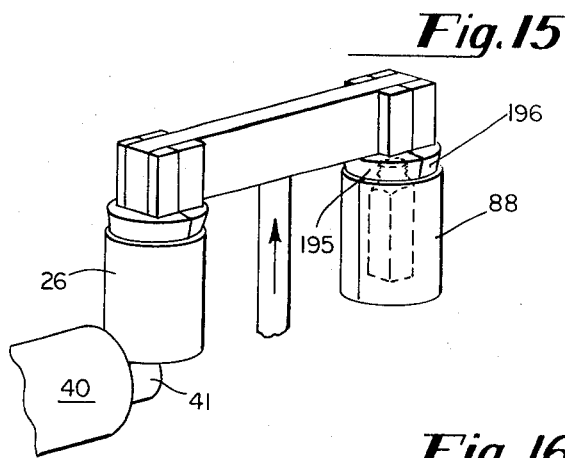
Figure 12:
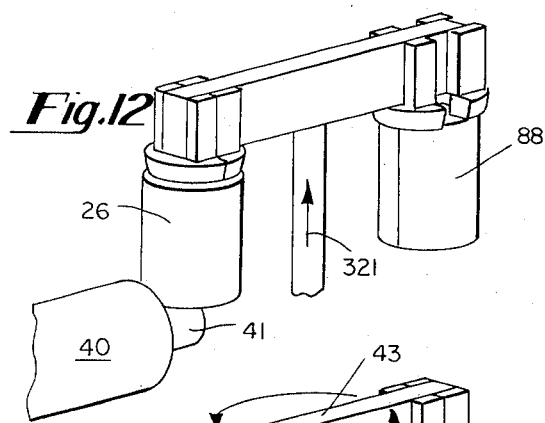
Figure 14:
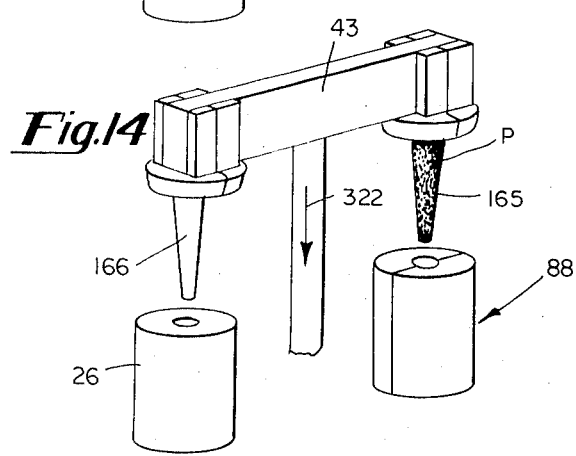

The head 43 is then driven vertically donwardly in the direction of the arrow 322, to dispose the core rods 165 and 166 within the respective mold cavities 88 and 26, as illustrated in FIG. 14, and then in FIG. 15. In the position illustrated in FIG. 15, the injection head 41 is then operative to inject a parison-molding material into the mold 26, in the manner discussed above for the operational stage illustrated in FIG. 12, for the formation of a parison on the core rod 166. However, simultaneously therewith, the parison P that was previously formed on the core rod 165 is blown to form a bottle, for example, within the mold 88. It will be noted that during the rotational motion illustrated in FIG. 13, during the downward motion illustrated in FIG. 14 for the head 43 and during the bottle-blowing operation illustrated in FIG. 15, coolant may constantly be supplied through the traveling neck rings 195 and 196, for cooling the neck portions of the bottle or other suitable article being formed.

Figure 16:
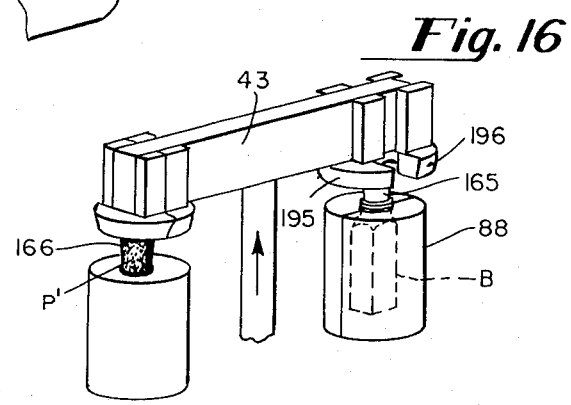
Figure 13:
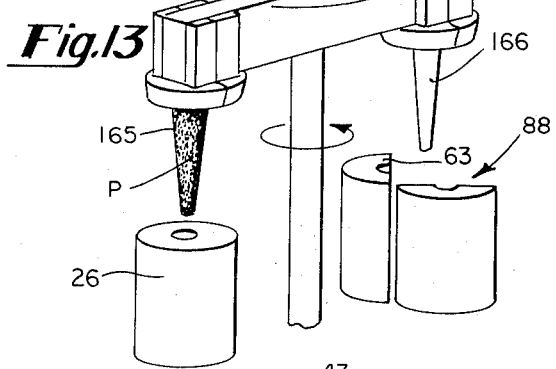
Figure 17:
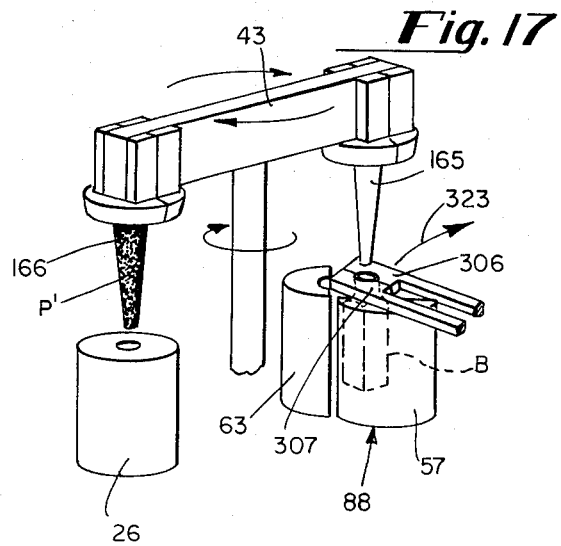

Upon the formation of the bottle B reaching a predetermined stage of completion, the split traveling neck rings 195 and 196 will then be actuated to be spread as illustrated in FIG. 16, followed by the then upward driving of the head 43 (once the ring portions 195 and 196 are sufficiently open to clear the neck of the bottle B), withdrawing the core rod 165 from the bottle B then formed within the mold 88, simultaneously with the withdrawal of the core rod 166 with another parison "p¹" carried thereon. Gripping arms 306 and 307 will then engage the neck of the bottle B, as illustrated in FIG. 17, followed by the opening of the mold half portions 57 and 63 of the blow mold 88. When the core rod 165 is completely clear of the neck of the bottle B the arms 306 and 307 will laterally withdraw the bottle B from the mold 88, through the arcuate path of motion indicated by the arrow 323, for example, in FIG. 17. The head 43 will then be rotated or pivoted in the clockwise direction of the several arrows illustrated in FIG. 17, to again place the core rod 165 above the parison mold 26, whereby the head 43 will then be driven vertically downwardly to place the core rod 165 in the mold 26, and to simultaneously place the core rod 166 in the blow mold 88, with its parison P¹ thereon, with another parison then being formed simultaneously with the formation of another bottle. After the operation is completed, the head 43 will again be raised as discussed above with respect to FIGS. 15 through 17, and the head 43 will again be rotated, but in a counter-clockwise direction. The procedure will then continue with the concurrent formation of parisons and the blowing of bottles from next-previously-formed parisons.

The details of operation of the various features of this invention have been discussed in detail above in conjunction with an explanation of the several components thereof that facilitate the provision of such functions, and accordingly, the operational sequence of the various operative components need not be duplicated herein. It will, however, be apparent that various modifications may be made in the several structural features of this invention, both in the details of construction, as well as in the operational and functional features thereof, and even in the sequence of such operations, all within the spirit and scope of the invention.

Indeed, the preferred embodiment of the present invention is a modification of that illustration in the above-referenced FIGS. 1 through 17. In this modification, the modified design of the internally cooled traveling neck ring mold and the opening-closing mechanism thereof facilitates the opening and closing of the neck ring molds. In addition, means is provided for internally cooling the core rods. Except for these modifications, and the associated modification of transfer head 43 to adapt to these modifications, the injection blow molding machine in the preferred form of the present invention is as illustrated in FIGS. 1-17.

With regard specifically to the preferred form of the invention and the particular components thereof illustrated in FIGS. 18-21, it should be understood that the features of the machine not described and illustrated are otherwise the same as those illustrated in FIGS. 1-17 and that, wherever possible, like elements in FIGS. 18-23 are given like reference numerals as those in FIGS. 1-17.

Figure 18:
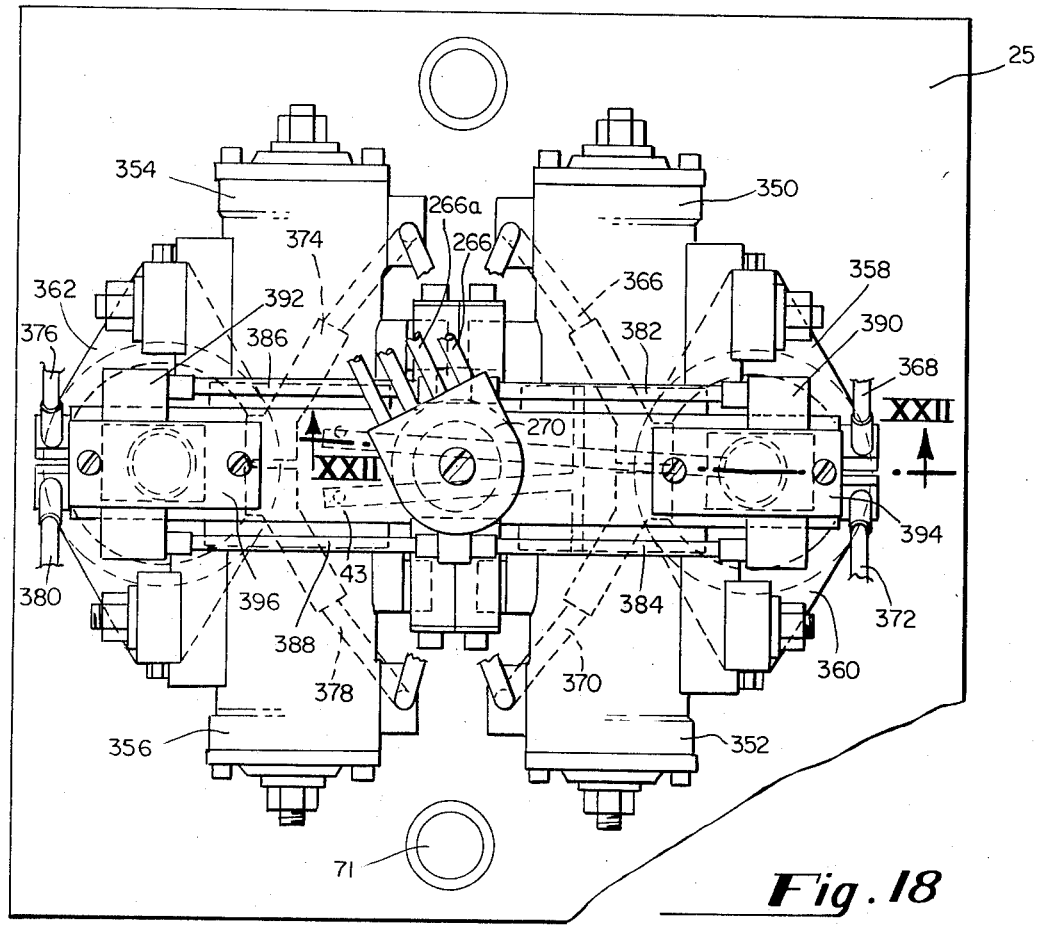
FIGS. 18 through 23 illustrate the preferred embodiment of the present invention.

With regard specifically to FIG. 18, there is shown in plan view the transfer head of the injection blow molding machine in the preferred embodiment of the present invention, together with the associated neck ring actuating mechanisms. More specifically, transfer head 43, on which is transversely mounted neck ring actuating cylinders 350, 352, 354 and 356 bolted, respectively, to split neck ring mold halves 358, 360, 362 and 364 is shown, along with associated coolant inlet and outlet lines, 266 and 266a, for example, to the machine and specific split neck ring mold coolant inlet and outlet lines 366, 368, 370, 372, 374, 376, 378 and 380. Also seen in FIG. 18 are semi-flexible core rod coolant inlet and outlet lines 382, 384, 386 and 388 communicating with core rod coolant manifolds 390 and 392 and manifold backing plates 394 and 396.

Figure 19:
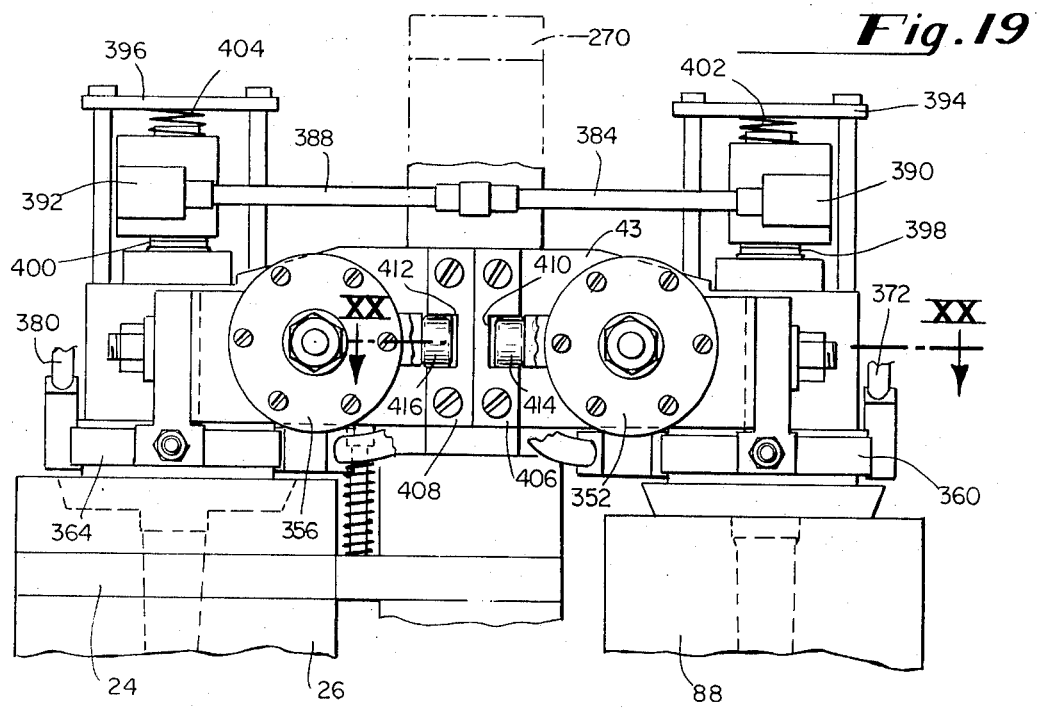

A side view showing most of the same elements is seen in FIG. 19. Further features of this embodiment of the present invention shown in FIG. 19 include yieldable resilient core rod seals 398 and 400 and core rod retainer springs 402 and 404. Also seen attached to head 43 are bolt-on guide members 406 and 408 with tracks 410 and 412 for guide rollers 414 and 416 attached to neck ring actuating cylinders 352 and 356 to guide the horizontal movement thereof during actuation of the split neck ring mold.

Figure 20:
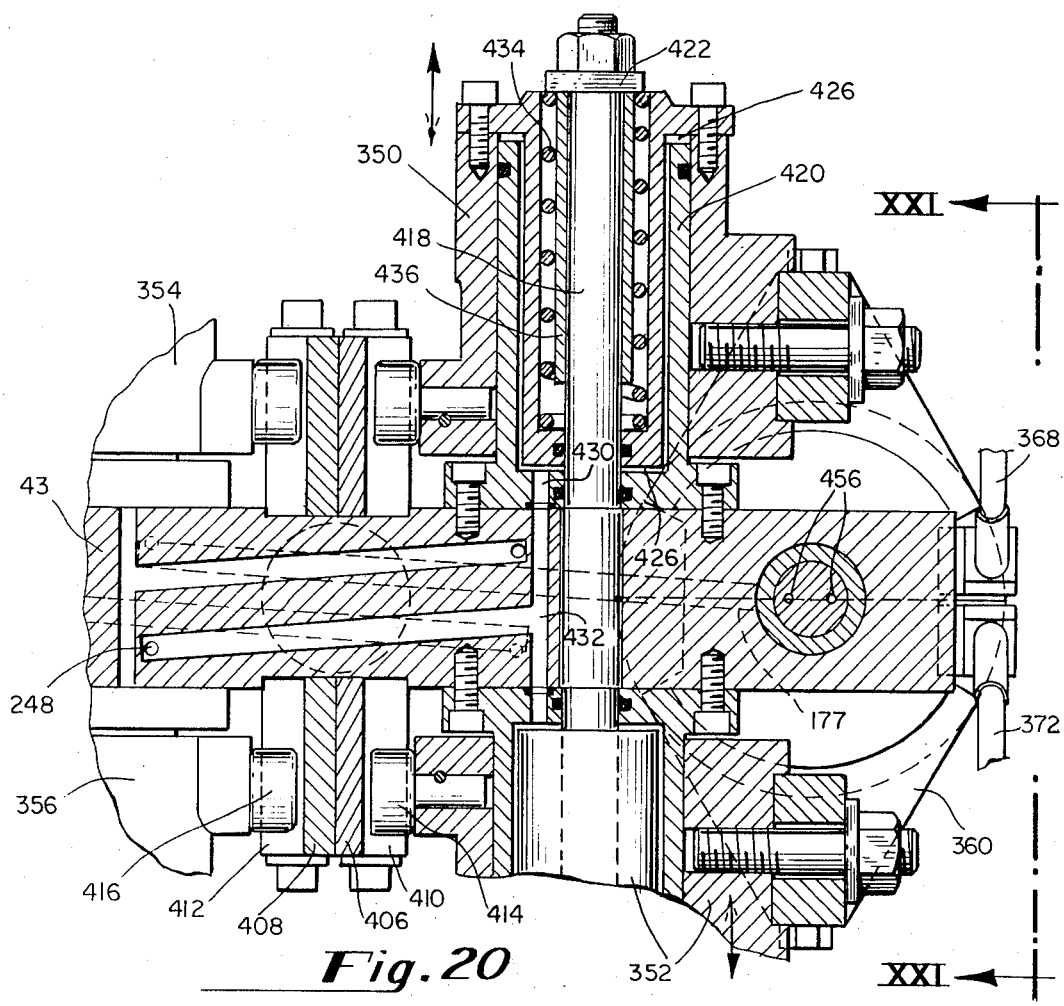
Figure 21:
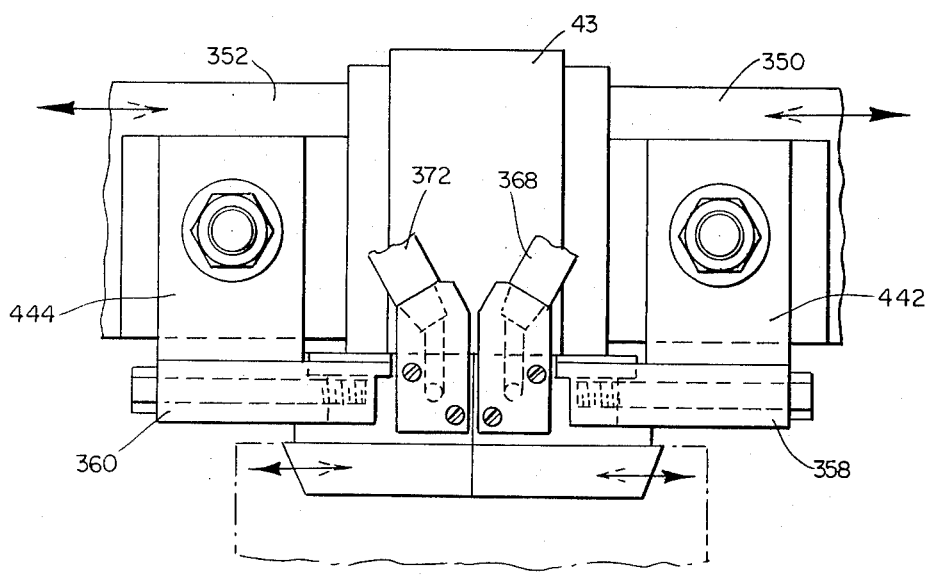

The function of the neck ring actuating cylinders in this the preferred embodiment of the present invention may best be understood by reference to FIGS. 20 and 21. In FIG. 20 particularly, which is a cross-section in the plane XX—XX of FIG. 19, there is seen a cut-away view of actuating cylinder 350. Actuating cylinder 350 is mounted over and slidingly engages an inner cylindrical member 420, fixedly secured to transfer head 43. A slight gap 124 is maintained between inner cylindrical member 420 and actuating cylinder 350, including opposed surface spaces 426 and 428 wherein the surfaces are generally perpendicular to the axis of central shaft member 418. Gap 424 communicates through a passageway 430 in inner cylindrical member 420 with pressurized air inlet passageway 432, in turn communicating with pressurized air inlet 248 in head 43. Outward movement of actuating cylinder 350 is resisted by spring 434 and stop sleeve 436.

Each of the other neck ring actuating cylinders 352, 354 and 356 include identical functioning mechanisms, of which the outer surface of the corresponding inner cylindrical member associated with actuating cylinder 352 is seen in the partially cut-away view of actuating cylinder 352 in FIG. 20.

Thus, with transfer head 43 in a lower or seated position, as seen in FIG. 3, an air inlet in communication with pressurized air delivery line 246 (as seen in FIG. 8), upon actuation of solenoid 146, passes pressurized air through passageway 432 into gap 424 pushing apart the opposing surfaces in the spaces 426 and 428 causing outward movement of actuating cylinders 350 and 352 and opening of corresponding split neck ring mold members 358 and 360, as better seen in FIG. 21, by virtue of the attachment between actuating cylinders 350 and 352 by bolt and connecting members, such as those seen in FIG. 21, more specifically bolts 438 and 440, connecting members 442 and 444 in turn bolted to connecting pieces of split neck ring mold halves 358 and 360.

Figure 22:
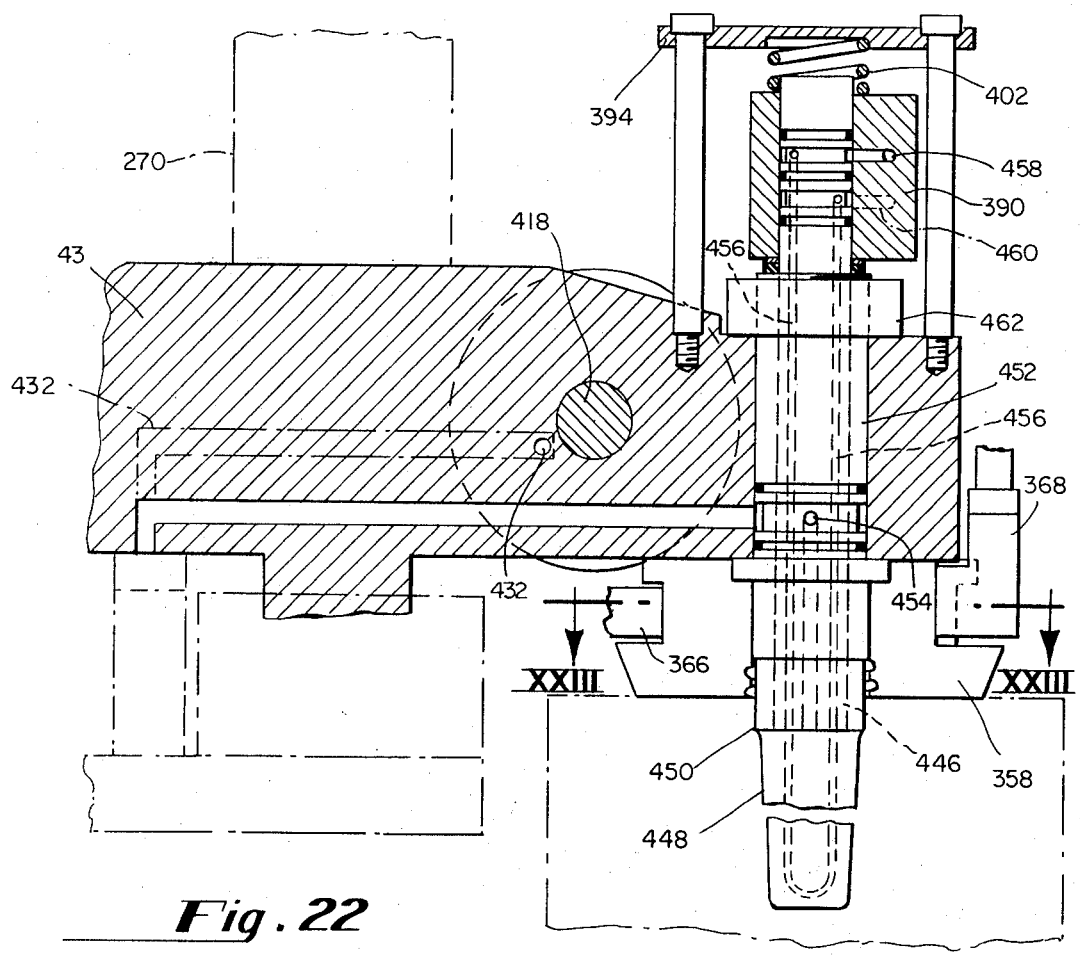

In FIG. 22, a sectional view in the plane XXII—XXII of FIG. 18, there is seen head 43 with blow air inlet passageway 177 and an associated internally cooled core rod 446 with a lower extendible portion 448 below a neck opening valve 450 and an upper outer portion 452 of core rod 446. Also seen again in this view are yieldable resilient core rod seal 398, core rod coolant manifold 390, core rod retainer spring 402 and backing member 394. Within the upper portion 452 of core rod 446 blow air passageways 454 extend downward to neck opening valve 450. Also extending through both upper portion 452 and lower portion 448 of core rod 446 are coolant passageways 456 communicating in turn with coolant inlet and outlet openings 458 and 460, respectively in manifold 390.

Core rod 446 is retained in transfer head 43 by retainer collar 462.

Upon admission of blow air through passageway 177 and 454 to open neck valve 450 and extend the lower portion 448 to core rod away from upper portion 456 thereof, passageway 456 also moves downwardly with respect to fixed upper portion 456 of core rod 446. Spring 402 reacts against manifold 390 which reacts against the waldes ring 398 which keeps neck valve 450 open at all times except when injection takes place in the parison mold. The material in the mold then exerts pressure against lower portion of core rod 448, overcomes spring 402, and closes neck valve 450. Coolant inlet and outlet 458 and 460 are sufficiently large to remain in communication with passageway 456 during this movement. Thus, by circulating coolant of predetermined character and temperature through passageway 456, a pre-determined relatively constant temperature may be maintained in core rod 446 to better control the process characteristics and enhance the quality and blowability of a parison mold thereon.

Figure 23:
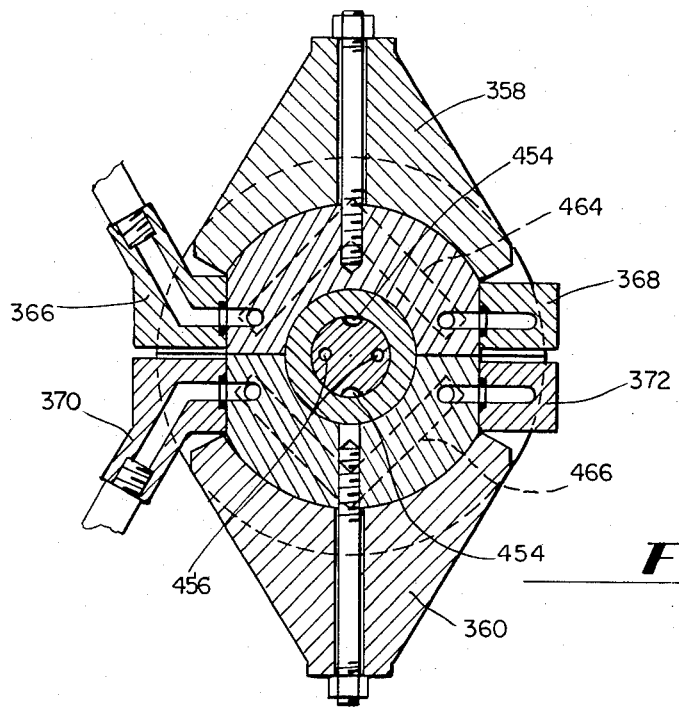

In FIG. 23, a sectional view of split neck ring mold members 358 and 360, taken in the plane XXIII—XXIII of FIG. 22, there is shown the coolant passageways 464 in a typical split ring molding member of this invention which, as heretofore described, enables precise temperature control of the neck portion of a molded parison in order to effect setting thereof independent of other process functions of the machine of this invention.

The improved mechanisms for effecting opening of the split neck ring mold members of the present invention in the preferred embodiment thereof as shown and described with respect to FIGS. 18—23, the improved parison moldability effected by the internal temperature controlled core rod used herein, and particularly the mechanism for providing such a core rod with coolant fluid, and the controlled independent setting of the parison neck in the injection blow molding machine of this invention and particularly the preferred embodiment thereof all represent significant advances over the prior art and collectively, with the other features of the present invention previously described, form an injection blow molding machine with a high degree of flexibility having many advantages recommending its use on an industrial scale, not the least of which is its adaptability to use in modular units.

It is to be understood of course that while the present invention has been described with respect to particular embodiments thereof, it is not limited thereto, as numerous variations and modifications of this invention will be apparent to those skilled in the art, all of which, to the extent they do not depart from the true spirit and scope of the present invention, are intended to be encompassed by the appended claims.

We claim:

1. A machine adapted for reliably and efficiently forming hollow containers by an injection blow molding process, said machine comprising
   A. a central vertical support post including indexing means to rotate said post and elevation means to raise and to lower said post,
   B. a transfer head mounted on said post including
      i. a first and a second core rod mounting means each adapted to receive core rods to be downwardly extended therefrom at two diametrically opposite core rod positions on said head, and
      ii. split neck ring mold mounting means at each of said core rod positions, said mounting means adapted to permit split neck ring molds mounted thereon to move toward and away from one another,
   C. split neck ring mold actuating means consisting of
      i. biasing means urging said split mounting means at each position toward one another and
      ii. opening means consisting of air actuated pistons adapted to overcome said biasing means and to force said split mounting means at either position away from one another upon the admission of pressurized air thereto,
   D. a parison mold adapted to communicate through an injection nozzle with a source of viscous plastic material and a means for injecting said material into said parison mold, said parison mold further being positioned and adapted to receive a core rod and a split neck ring mold at said first of said core rod positions by vertical downward movement of said transfer head,
   E. a blow mold at a location diametrically opposite that of said parison mold, said blow mold being split along its length and hinged to permit separation of the two mold halves, said mold being positioned and adapted to receive a core rod at said second of said core rod positions by vertical downward movement of said transfer head,
   F. a first, and second pressurized air delivery means adapted to sealingly engage corresponding air inlets in said transfer head when said transfer head is lowered,
   G. said corresponding air inlets consisting of
      i. a first pair of air inlets in said transfer head adapted to engage said air delivery means when a core rod mounted on said first core rod mounting means is disposed in said blow mold, and
      ii. a second pair of air inlets in said transfer head adapted to engage said air delivery means when a core rod mounted on said second core rod mounting means is disposed in said blow mold,
   H. air passageways within said head for delivering pressurized air from
      i. one of the first pair of air inlets to the interior of a core rod mounted on said first core rod mounting means,
      ii. the other of the first pair of air inlets to the air actuated piston of said actuating means at said first core rod position,
      iii. one of the second pair of air inlets to the interior of a core rod on said second core rod mounting means, and
      iv. the other of the second pair of air inlets to the air actuated piston of said actuating means at said second core rod position,
   I. said elevation means consisting of means
      i. to raise said head from a seated position with said core rods in said molds and said pressurized air delivery means in engagement with said inlets, to a raised position with the bottom of said core rods above said molds, and
      ii. to lower said head from its raised position to its seated position, and
   J. said indexing means being operative with said head in its raised position to index said head through an arc of 180° about said post.

2. A machine, as recited in claim 1, wherein upon hinged opening of said blow mold, a gripper arm is actuated to grip a container formed in said blow mold and to remove it to a finished product receiver.

3. A machine, as recited in claim 1, wherein each of said split neck ring molds includes a passageway for coolant fluid therethrough, said passageway having an inlet and an outlet on the exterior of said neck ring mold, said machine further including means for delivering coolant fluid to said inlet and for receiving said fluid from said outlet.

4. A machine, as recited in claim 1, wherein the exterior side surfaces of said neck ring molds taper inward from top to bottom and thereby mate with a correspondingly dimensioned and tapered recess in the top of said parison mold.

5. A machine, as recited in claim 1, wherein said parison mold, and the core rods adapted to be inserted therein, are both tapered inwardly, from top to bottom, along their respective side walls toward their common axis, said taper causing said side walls to form an angle of no more than 2° with a vertical line intersecting said side walls.

6. A machine, as recited in claim 5, wherein said angle is approximately ½°.

7. A machine, as recited in claim 1, wherein said indexing means consists of means for reciprocably indexing said transfer head 180° in one direction and then 180° in the reverse direction.

8. A machine, as recited in claim 7, wherein said indexing means includes an index sprocket wheel, located on the axis of said central post, engaging a sprocket chain, said chain including means at each end to move said chain along its path toward that end, a sufficient distance to cause said index sprocket to rotate 180°, said machine further including idler sprockets to cause said chain to engage said index sprocket.

9. A machine, as recited in claim 8, wherein said index sprocket is mounted on a sleeve with respect to which said central post is freely movable along its axis, said sprocket and sleeve further including vertical member extending therefrom parallel to said central post, each of said vertical members passing through a post indexing connection member fixedly secured to said central post, said vertical members being freely movable vertically within said connection members but substantially immovable horizontally with respect thereto.

10. A machine, as recited in claim 9, wherein said elevation means consists of a hydraulically operated piston located along the centerline of said central post.

11. A machine, as recited in claim 1, wherein said core rod mounting means includes coolant means for delivering an internal coolant fluid thereto and for receiving said fluid therefrom, said coolant means includes a coolant manifold, at each of said core rod positions, with passageways therethrough for delivering said coolant to said core rod and for receiving said coolant therefrom, said machine including means for delivering said coolant to said manifold and for receiving said coolant therefrom, said manifolds being positioned above said transfer head at each of said core rod positions and urged downward toward said transfer head.

12. A machine, as recited in claim 1, wherein said split neck ring molds separate along a vertical plane therethrough, and each neck ring mold is actuated by an air actuated cylinder mounted on said transfer head, the axis of said cylinder being perpendicular to said vertical plane and on the same side thereof as the neck ring mold half to which it is fixedly secured, said cylinder including guide means to ensure its travel in a line perpendicular to said vertical plane, said cylinder also including means to stop its travel at a pre-determined point as it moves away from said vertical plane upon the introduction of pressurized air thereto, and biasing means for urging it and the neck ring mold half attached to it back toward said vertical plane in the absence of such pressurized air.

13. A machine, as recited in claim 12, wherein said neck ring mold halves at both core rod stations separate along a common vertical plane which also passes through the axis of said central post, said actuating cylinders being mounted externally on said transfer head.

14. A machine, as recited in claim 13, wherein said actuating cylinders are mounted in pairs at each end of the transfer head, each pair slidably engaging a common central shaft and a pair of fixed pistons attached to said transfer head.

15. A machine, as recited in claim 14, wherein said cylinders are each attached on their outer housing to a corresponding guide means mating with a guide means attached to said transfer head, and, through removable attachement means, to a corresponding neck ring mold half.

* * * * *